United States Patent
Tajirian et al.

(10) Patent No.: US 8,630,076 B2
(45) Date of Patent: Jan. 14, 2014

(54) SAFE DISCONNECT SWITCH

(75) Inventors: Edmond J. Tajirian, Rolling Hills Estates, CA (US); Jeff A. Knowles, Yorba Linda, CA (US); Mark D. Cayot, Long Beach, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 154 days.

(21) Appl. No.: 13/044,262

(22) Filed: Mar. 9, 2011

(65) Prior Publication Data

US 2012/0229944 A1 Sep. 13, 2012

(51) Int. Cl.
*H02H 3/24* (2006.01)
*H01H 7/00* (2006.01)

(52) U.S. Cl.
USPC ............. 361/86; 361/90; 307/131; 307/141

(58) Field of Classification Search
USPC ................. 361/86, 90; 307/131, 141
See application file for complete search history.

(56) References Cited

U.S. PATENT DOCUMENTS

| | | | | |
|---|---|---|---|---|
| 3,371,227 A | * | 2/1968 | Sylvan | 327/475 |
| 3,774,076 A | | 11/1973 | Weinger | |
| 4,105,023 A | * | 8/1978 | Marchese et al. | 600/510 |
| 5,144,152 A | * | 9/1992 | Costantino et al. | 307/11 |
| 5,200,877 A | | 4/1993 | Betton et al. | |
| 5,296,997 A | | 3/1994 | Betton et al. | |
| 5,450,008 A | * | 9/1995 | Good et al. | 324/166 |
| 5,663,858 A | | 9/1997 | Etter | |
| 5,719,519 A | | 2/1998 | Berringer | |
| 5,883,816 A | * | 3/1999 | Dollhopf et al. | 700/293 |
| 5,986,866 A | | 11/1999 | Zuzuly | |
| 6,404,608 B1 | | 6/2002 | Pryor et al. | |
| 6,687,106 B1 | | 2/2004 | Tanaka et al. | |
| 6,934,139 B2 | | 8/2005 | Kumagai et al. | |
| 7,345,383 B2 | * | 3/2008 | Zushi et al. | 307/130 |
| 2008/0266740 A1 | | 10/2008 | Smith | |
| 2009/0085542 A1 | * | 4/2009 | Numano et al. | 323/282 |

FOREIGN PATENT DOCUMENTS

EP 1652301 * 7/2004 ............ H03K 5/1536

* cited by examiner

*Primary Examiner* — Rexford Barnie
*Assistant Examiner* — Zeev V Kitov
(74) *Attorney, Agent, or Firm* — Stetina Brunda Garred & Brucker

(57) ABSTRACT

A safe disconnect circuit is provided for mitigating the effect of harmful circuit conditions upon a load, such as an integrated power module (IPM). The safe disconnect circuit comprises a switching circuit operative to receive a pulsed input signal, and to detect the presence of a load threatening input signal, e.g. a load control signal, having an amplitude below a preset amplitude threshold and a duration beyond a present duration threshold. The switching circuit is operative to terminate load power in response to detect a presence of the load threatening signal.

8 Claims, 2 Drawing Sheets

SAFE DISCONNECT SWITCH

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to circuits regulating the operation of high-powered, high-voltage circuits, such as integrated power modules. More particularly, the present invention relates to a safe disconnect circuit for turning off integrated power modules in response to the loss of a control signal.

Integrated power modules (IPMs) and the like function to provide high-current/high-voltage outputs. Given the high-power outputs, switching the modules off/on must be done with considerable care to avoid damaging components or otherwise creating unsafe conditions.

In many cases such modules are constructed to operate in a normally on condition, such that loss of a control signal would not cause the module to turn itself off. This can be useful to avoid unnecessary switching of the module in response to spurious control signals.

However, once it is determined that a pulse in the circuit is causing loss of the control signal, leaving the module in an on condition can create hazards, as the circuit may not be able to be properly regulated.

Accordingly, it is desirable to provide a safe disconnect circuit for interfacing high-voltage/high-current supplies, such as integrated circuit modules.

It is further desirable that the safe disconnect circuit be able to detect and respond to fault conditions, such as open circuits, causing the loss of control signals.

It is further desirable that the safe disconnect circuit be operative to differentiate between spurious variations in a control signal and fault conditions, in order to avoid unnecessary shut down of the IPM in response to such spurious conditions.

It is further desirable that, upon detection of a fault, the safe disconnect circuit generates a signal that turns off the IPM, and holds the IPM in an off condition, notwithstanding the occurrence of spurious input signals.

It is further desirable that the safe disconnect circuit include features to electrically isolate the circuit output signal to the IPM from the circuit input, to avoid potentially hazardous conditions of the input circuit and at the IPM.

These and other objects and advantages are achieved in accordance with the invention as described and illustrated herein.

BRIEF SUMMARY

A safe disconnect circuit is provided for mitigating the effect of harmful circuit conditions upon a load, such as an integrated power module (IPM). The safe disconnect circuit comprises a switching circuit operative to receive a pulsed input signal, and to detect the presence of a load threatening input signal, e.g. a load control signal, having an amplitude below a preset amplitude threshold and a duration beyond a present duration threshold. The switching circuit is operative to terminate load power in response to detect a presence of the load threatening signal.

The safe disconnect circuit may be useful to determine shorts or openings on the input to a high voltage, high current load that operates in a normally on condition. As the input circuit controls the operation of the load, such shorts and opens may operate to cause the load to transition between off and on conditions, in response to spurious signals, thereby damaging the load.

In the presently preferred embodiment the safe disconnect circuit may comprise an RC circuit for maintaining a load in an off condition until such time as the switching circuit detects the presence of a proper input signal, e.g. having an amplitude in excess of a preset amplitude threshold, and a duration in excess of a preset duration threshold. The RC circuit may be operative to maintain the load in an off condition where the circuit detects the presence of an input signal having an amplitude less than the preset amplitude threshold and/or a duration less than the preset duration threshold.

The safe disconnect circuit may further include a pull-down circuit for maintaining the switching circuit in a conductive state, i.e. terminating load power, until the input signal exceeds the preset amplitude threshold.

In one embodiment the preset amplitude threshold is 0.7 volts, and the preset duration threshold is 0.5 msec.

The safe disconnect circuit may further include an optical coupler circuit disposed intermediate the switch and the load, the optical coupler circuit being operative to electrically isolate the load from the switch.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise variations that are within the scope and spirit of the invention disclosed herein, including various ways of detecting and responding to fault conditions, e.g. depending upon the input signal parameters. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
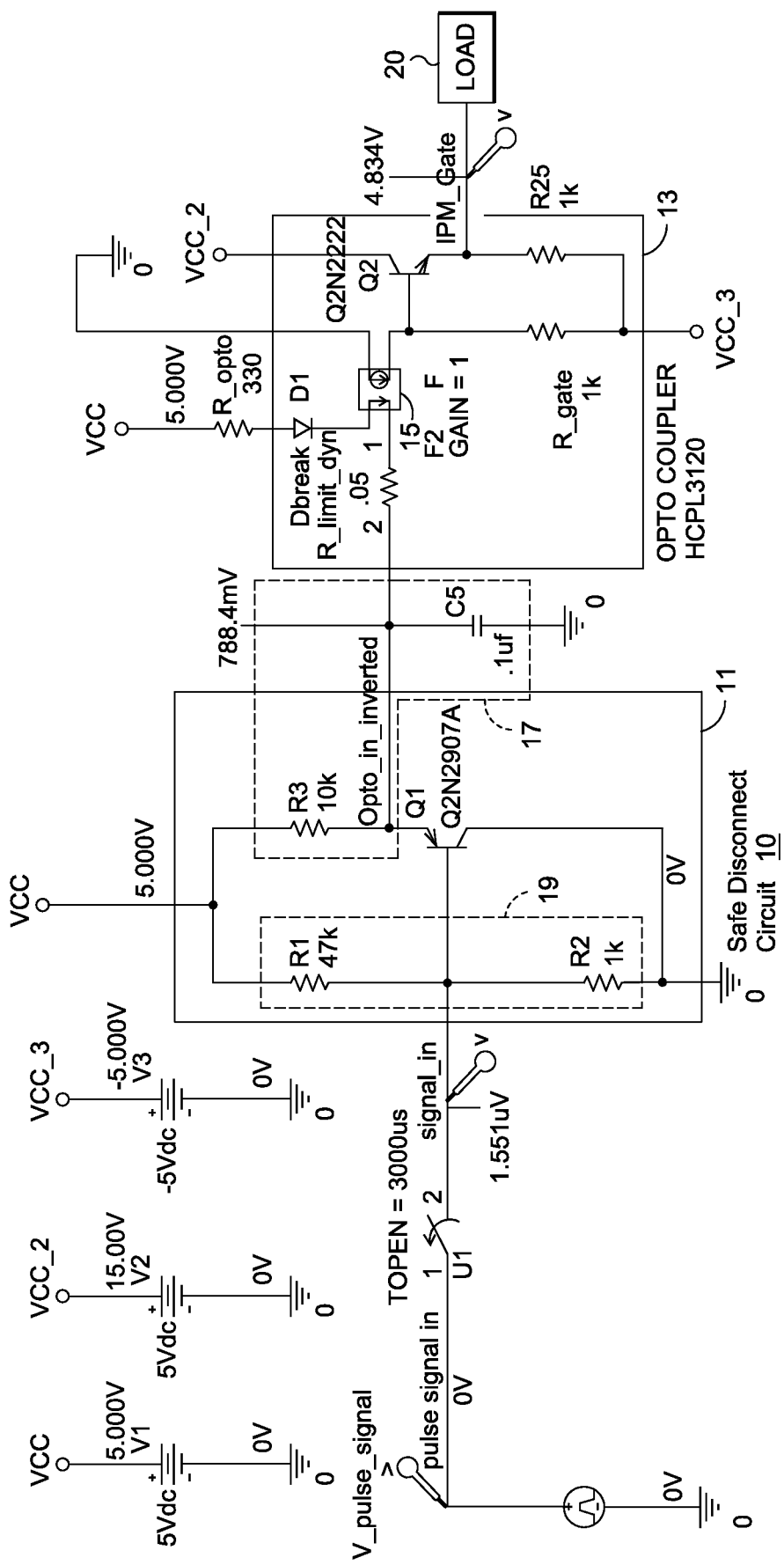
FIG. 1 is a circuit diagram of one embodiment of the invention.

FIG. 1 illustrates a circuit diagram illustrating one implementation of the presently preferred embodiment. The load control signal input to the circuit is a pulsed input signal identified as V(Pulse_Signal_In). The pulsed input signal in the illustrated embodiment is approximately a five volt (5 Volt) signal having a pulse width of 200 μs and a period of 1000 μs. Switch U1 represents a fault in the control circuit resulting in an open connection between the pulse generator and the safe disconnect circuit 10.

Under normal operating conditions (no fault) a high pulsed input signal into switching circuit 11 (i.e. approximately 3.5 v or more) creates a positive voltage on the base of Q1, turning Q1 off. When Q1 is off the output of circuit 11 goes high, to approximately 4.5 volts, which precludes current flow through the coupling unit 15 of the optical coupler circuit 13, which turns off Q2, causing the output of the optical coupler circuit 13 to substantially conform with VCC3, i.e. minus 5 volts. Where the load 20 is a normally on circuit such as an IPM, the high output from the optical coupler circuit 13 operates to turn the IPM off. As a result, the overall operation is that high pulsed input signal (control signal) into switching circuit 11 will normally operate to turn the IPM off, provided that the control signal remains positive for a sufficient period of time.

Figure 2A:
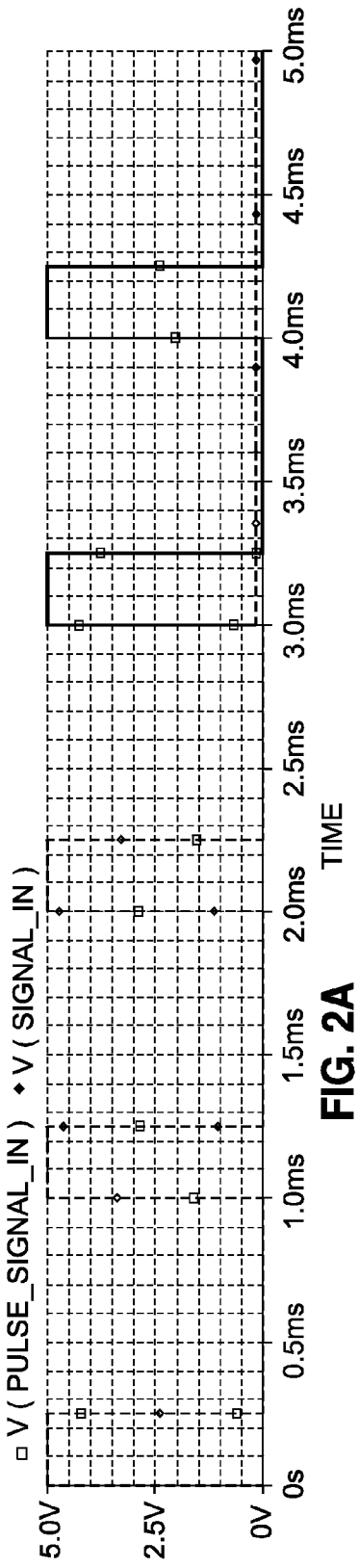
FIG. 2*a-c* illustrates signals generated in the circuit shown in FIG. 1, during normal operation and in response to a detected fault.

Referencing FIGS. 1 and 2*a*, the input to Q1, i.e. V(Signal_In) follows the pulse modulator output, V(Pulse_Signal_In), for the first three pulses, each having a pulse width of 250 ns and a period of 1 ms. However, at 3 ms a fault condition is represented to occur (U1 open), such that while V(Pulse_Signal_In) continues to pulse, V(Signal_In) stays at near 0, i.e. approximately 1.551 micro volts. This causes Q1 to turn on and the input to the optocoupler, V(Opto_In_Inverted), to remain low (i.e. below 1.5v).

Figure 2B:
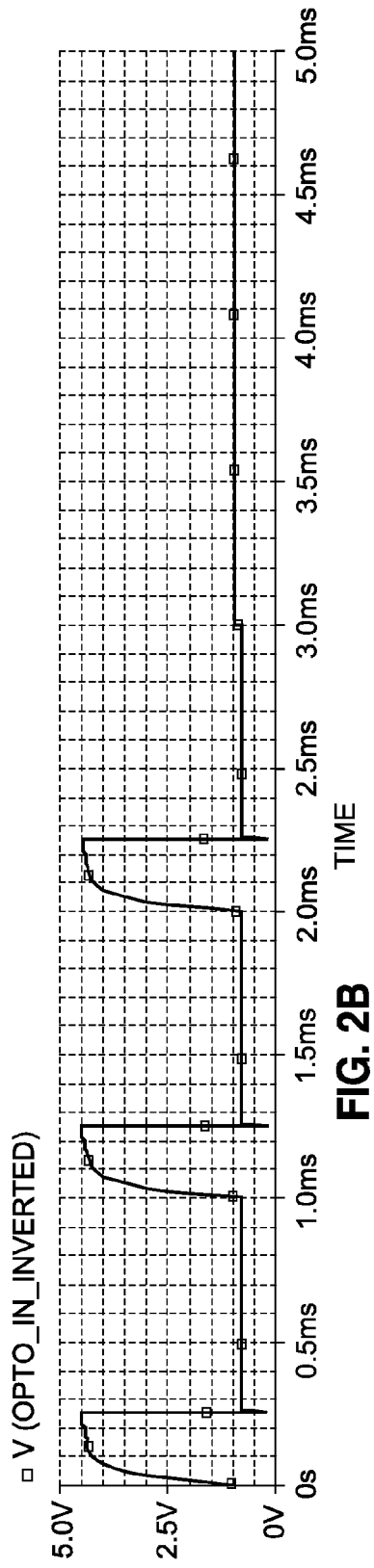

FIG. 2*b* illustrates how V(Opto_In_Inverted) normally follows the pulsed signal V(Pulse_Signal_In) when no fault occurs. However, when a fault occurs, V(Signal_In) remains low and V(Opto_In_Inverted) also remains low.

When a fault occurs, the output of switching circuit 11, which varies as Q1 is turned on and off under normal conditions, no longer follows V(Pulse_Signal_In) as the input to the base of Q1 remains low and Q1 remains in an on condition. The R1/R2 voltage divider network of switching circuit 11 then locks on, with an output of Q1, approximately 1 volt (i.e. low, as shown at FIG. 2*b*), starting at 3.0 ms.

Figure 2C:
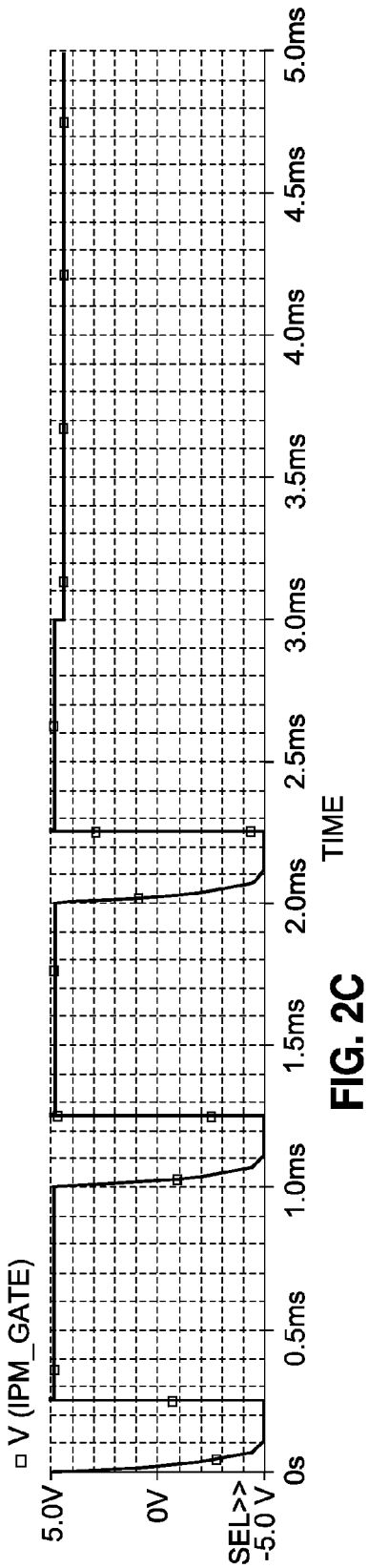

As shown at FIG. 2*c*, the output of optical coupler circuit 13, taken from the output of Q2, normally is the inverse of the output of switching circuit 11, V(Opto_In_Inverted). Under normal operating conditions, as the output of switching circuit 11, V(Opto_In_Inverted), goes high, the current through optical coupler circuit 13 is turned off, turning off Q2 and driving the output signal, V(IPM_Gate) low, to approximately −5 volts.

However, when Q1 is turned on, in response to positive pulsed signal, or in response to a fault, the output of switching circuit 11, V(Opto_In_Inverted), becomes low, allowing current to flow through optical coupler circuit 13, which in turn turns on Q2 and causes the output of optical coupler circuit 13, V(IPM_Gate), to rise to approximately 5 volts.

When an open condition occurs (starting at 3.0 ms) Q1 remains on, causing current to flow through the coupling unit 15, which turns on Q2, holding the output of optical coupler circuit 13, V(IPM_Gate), at a high level, thereby turning off a normally on ICM.

As the voltage divider R1/R2 holds the output of Q1 at approximately 1.551 microvolts, the output of Q2 is therefore held at approximately 4.834 volts. That signal level causes the normally on IPM to turn off after it is maintained for a preset period of time, e.g. 2 ms, indicating that the pulsed input is no longer present.

R3/C5 form an RC circuit 17 which dictates the rise time of the output of switching circuit 11, V(Opto_In_Inverted), and correspondingly the output of optical coupler circuit 13, V(IPM_Gate). The values of R3 and C5 are selected to be sufficient to dampen any response to spurious input signals which do not extend for a predetermined period of time, less than 0.5 ms.

Resistor network R1, R2 functions as a pull down circuit 19, to maintain Q1 in the conductive state until V_signal_in returns to a sufficiently high, unambiguous level, e.g. greater than 0.7 volts, and remains at such voltage level for a sufficient time, e.g. as may be dictated by the RC circuit 17 (R3, C5). The RC circuit 17 may additionally operate to maintain Q1 in a non-conductive state for a period of time, notwithstanding transient low-level pulses on the base of Q1, as are represented in FIG. 2*b*. Accordingly, the safe disconnect circuit 10 is adapted to generate an output to turn off the load 20 where a low signal level appears for periods of time representative of conditions such as opens or shorts, but will not respond to substantially instantaneous pulses below a threshold level, which are shorter in time and unlikely to result in conditions that will cause damage to the load or associated equipment.

By dampening the response of the disconnect circuit to spurious inputs, and by locking the output signal level at a load disabling level when the pulse signal is not present for a sufficient period of time (until a threshold level input signal reappears), the present invention allows for safe regulation of a normally on IPM, within suitable parameters for detecting and responding to related conditions.

As one of ordinary skill will recognize, the safe disconnect switching circuit may be directly coupled to the load 20, omitting optical coupler circuit 13. Further, the functions of optical coupler circuit 13, i.e. to invert the output of switching circuit 11 and to electrically isolate the load 20 from switching circuit 11, can be implemented in a variety of alternate ways, within the scope and spirit of the present invention. For example, where the load is constructed to be normally off, optical coupler 13 may be implemented in an alternate manner to generate an output that follows, rather than inverts, the output of switching circuit 11.

What is claimed is:

1. A circuit for regulating the operation of an integrated power module (IPM) in response to detection of harmful input signal conditions, the circuit comprising:
   a switching circuit, electrically isolated from the IPM, the switching circuit being operative to receive a pulsed input signal to the switching circuit and to generate a switching circuit output signal in response to the amplitude and duration of the input signal; and
   an optical coupler circuit in electric communication with the switching circuit and the IPM, the optical coupler circuit being operative to generate an optical coupler output signal, for regulating the operation of the IPM in response to the switching circuit output signal; and
   an RC circuit for maintaining the optical coupler output signal at an IPM disabling level until such time as the switching circuit detects that the pulsed input signal has an amplitude of in excess of a preset amplitude threshold and a pulse duration in excess of a preset duration threshold dictated by the RC circuit.

2. The circuit as recited in claim 1 wherein the optical coupler output signal regulates the operation of the IPM, independent of any monitored conditions at the IPM.

3. The circuit as recited in claim 2 wherein the pulsed input signal is not in electrical communication with the IPM.

4. The circuit as recited in claim 2 wherein the RC circuit is further operative to maintain the IPM in an off condition when the switching circuit detects that the pulsed input signal has an amplitude less than the preset amplitude threshold dictated by the RC circuit.

5. The circuit as recited in claim 2 further comprising a pull down circuit for maintaining the switching circuit in a conductive state until the pulsed input signal exceeds a preset amplitude threshold.

6. The circuit as recited in claim 2 wherein the pulsed input signal is representative of open or short conditions.

7. The circuit as recited in claim 2 wherein the preset pulse amplitude threshold is 0.7 volts.

8. The circuit as recited in claim 2 wherein the preset pulse duration threshold is 0.5 msec.

\* \* \* \* \*